United States Patent [19]
Hamaue et al.

[11] Patent Number: 5,906,328
[45] Date of Patent: May 25, 1999

[54] PRE-TENSIONER FOR SEAT BELT DEVICE

[75] Inventors: Tetsuya Hamaue; Muneo Nishizawa; Hiroaki Kandori, all of Tokyo, Japan

[73] Assignee: Takata Corporation, Tokyo, Japan

[21] Appl. No.: 09/038,940

[22] Filed: Mar. 12, 1998

[51] Int. Cl.⁶ .................................................. B60R 22/46
[52] U.S. Cl. ............................................................ 242/374
[58] Field of Search ......................... 242/374; 280/806; 297/480

[56] References Cited

U.S. PATENT DOCUMENTS

| | | |
|---|---|---|
| 4,423,846 | 1/1984 | Föhl . |
| 4,750,685 | 6/1988 | Frei . |
| 5,451,008 | 9/1995 | Hamaue . |
| 5,489,072 | 2/1996 | Gordon et al. ........................ 242/374 |
| 5,553,803 | 9/1996 | Mitzkus et al. ........................ 242/374 |
| 5,794,876 | 8/1998 | Morizane et al. ...................... 242/374 |

FOREIGN PATENT DOCUMENTS

| | | |
|---|---|---|
| 58-195574 | 11/1983 | Japan . |
| 59-168860 | 9/1984 | Japan . |
| 7-5992 | 1/1995 | Japan . |
| 7-8110 | 2/1995 | Japan . |

Primary Examiner—John P. Darling
Attorney, Agent, or Firm—Kanesaka & Takeuchi

[57] ABSTRACT

A pre-tensioner of a seat belt device capable of securely and rapidly transmitting torque between a driven shaft and a rotational ring when the pre-tensioner is activated. The driven shaft projecting from a reel for retracting a seat belt is inserted into a housing and the rotational ring is positioned to surround a gear of the driven shaft. The rotational ring is provided with five guide faces in the inner surface thereof and pins are inserted into pocket portions of the rotational ring. Each pin is held at the both ends by an annular portion of a body and a cover. Stepped portions are formed along peripheries of both ends of each guide face to form spaces.

5 Claims, 15 Drawing Sheets

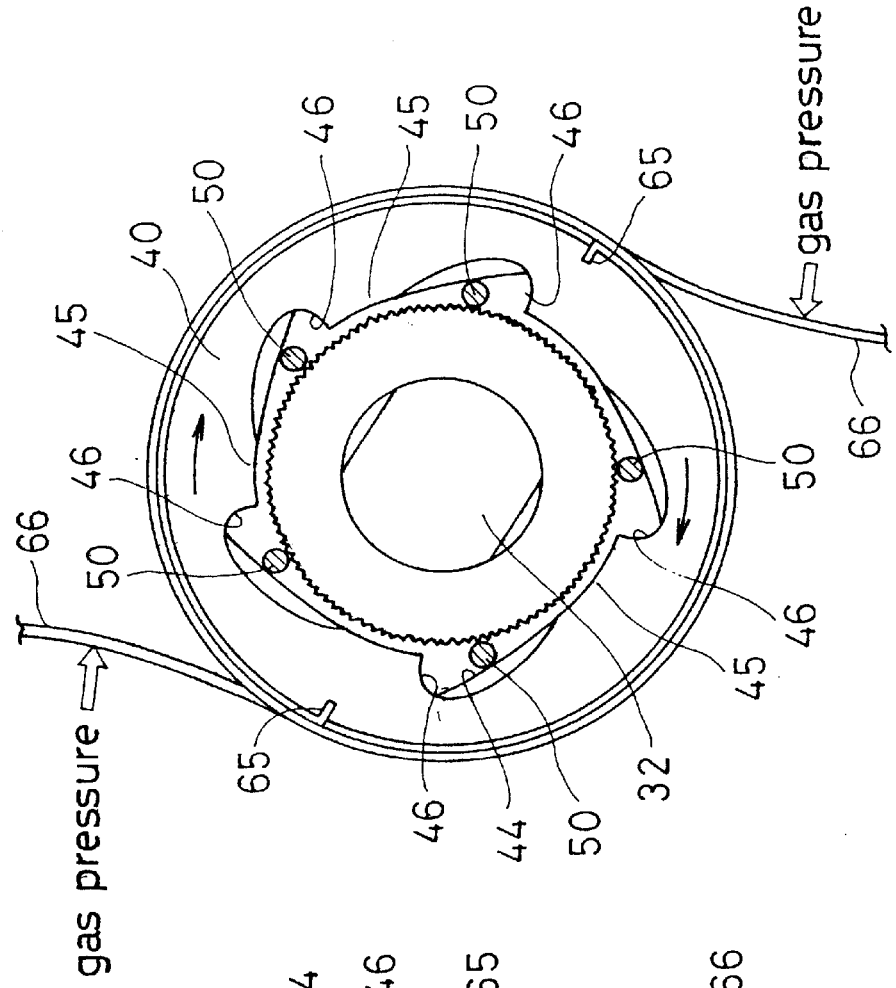
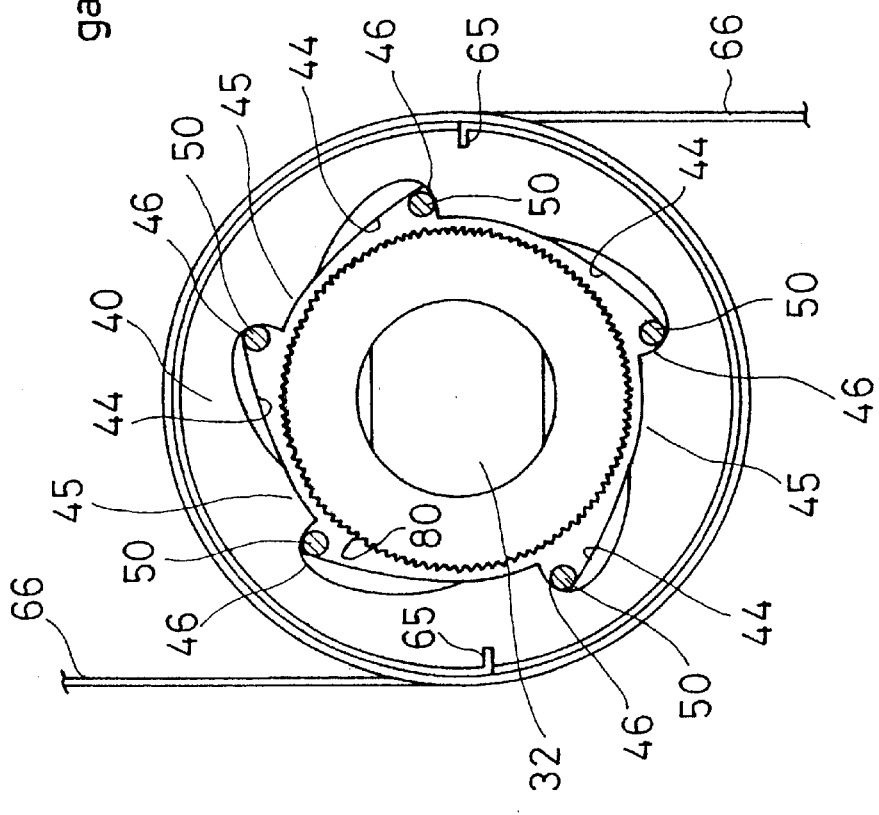
Fig. 3a
Fig. 3b

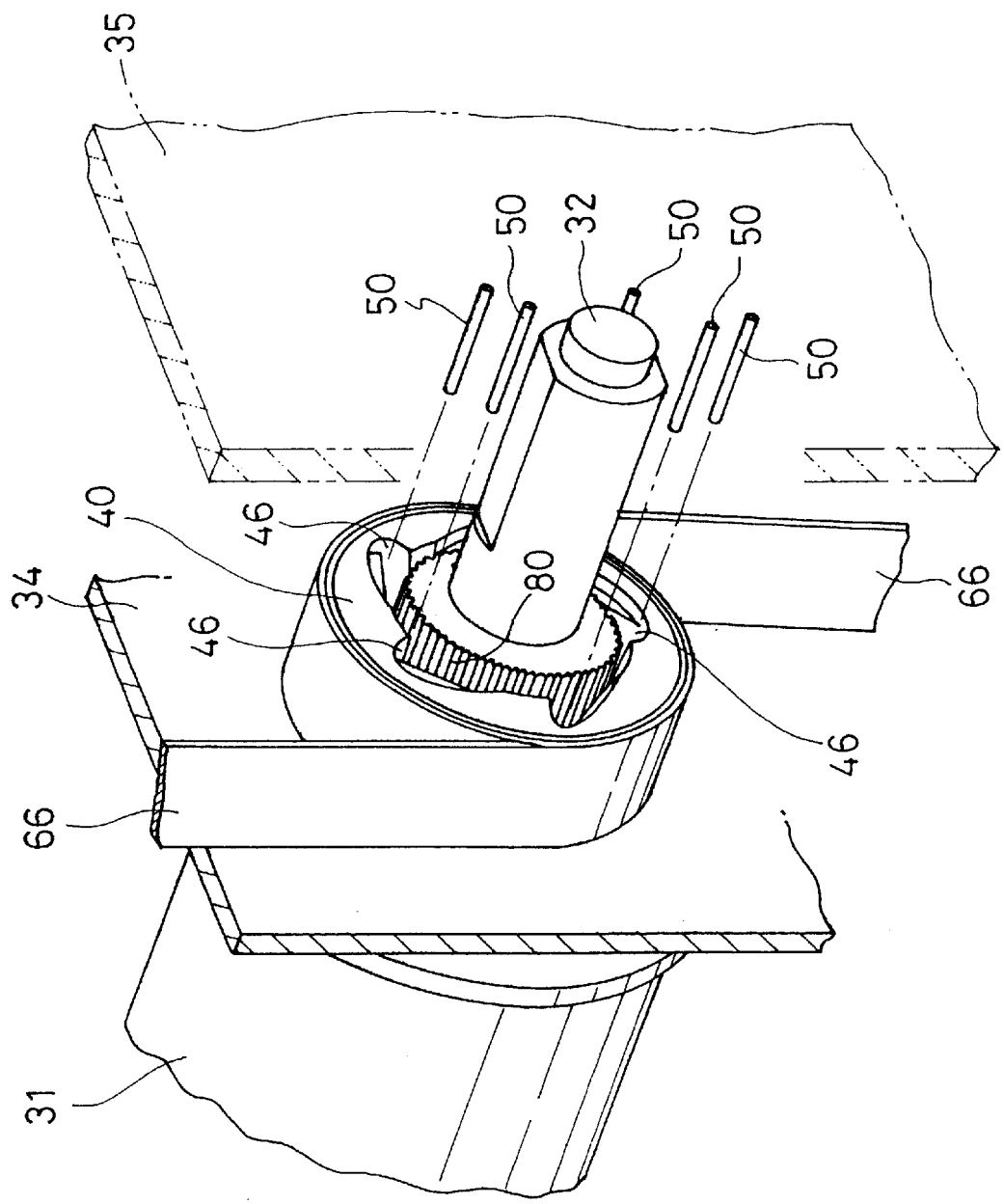

PRE-TENSIONER FOR SEAT BELT DEVICE

FIELD OF THE INVENTION AND RELATED ART

The present invention relates to a pre-tensioner incorporated in a seat belt device for a vehicle such as an automobile.

In a seat belt device with a pre-tensioner, the pre-tensioner rapidly retracts a seat belt by a predetermined length when detecting a vehicle collision whereby the seat belt device restraints an occupant strongly.

The pre-tensioner drives a driven shaft projecting from a reel of the seat belt device to rotate the reel of the seat belt device in a belt winding direction.

The pre-tensioner is required not to prevent free rotation of the reel when the vehicle is in the normal. For that, the pre-tensioner includes a clutch mechanism disposed between the driven shaft and a pre-tensioner drive unit to transmit driving force from the drive unit to the driven shaft only when a vehicle collision is detected.

FIGS. 9 through 13 show a conventional pre-tensioner (JPB H02-10743, the convention application of DE 3 037 738.9 and DE 3 131 637.9) in which shear pins are used as such a clutch mechanism.

A seat belt retractor 1 comprises a U-like frame 2 and a reel 9 disposed between side walls 2a and 2b of the frame 2, onto which a seat belt 5 is wound. Disposed outside the side wall 2a is a return spring unit 7 for biasing the reel 9 in the winding direction and disposed outside the side wall 2b is an emergency locking mechanism 6 for preventing the rotation of the reel (the withdrawing of the seat belt) when rapid decceration is exerted on the vehicle.

A pre-tensioner 8 is disposed outside the return spring unit 7. The pre-tensioner 8 comprises a driven shaft 10 (having a serration like a spur gear) projecting from the reel 9, shear pins 11 projecting from the unit 7, rollers 12 fitted onto the respective pins 11, and a ring 13 disposed coaxially with the driven shaft 10. The ring 13 is provided with guide faces 14 for pressing the rollers 12 in the centripetal direction of the ring. A bush 16 is fitted onto the driven shaft 10 and fixed with a screw 17.

An end portion of a rope 15 is wound onto the ring 13 and the other end is connected to a tensioner (not shown).

The rollers 12 are spaced apart from the outer surface of the bush 16 as shown in FIG. 12. Once the vehicle comes into collision, the tensioner is activated to pull the wire rope 15 upwardly of FIGS. 9 and 12, so that the ring 13 is rotated in the clockwise direction of FIG. 12. Therefore, the guide faces 14 press the rollers 12 so that the rollers 12 are pressed against the outer surface of the bush 16. In this case, the pins 11 are sheared.

The rollers 12 are engaged between the guide faces 14 and the outer surface of the bush 16 so as transmit the rotational force of the ring 13 to the driven shaft 10 whereby the reel 9 is rotated in the belt winding direction.

Though, in the conventional pre-tensioner shown in FIGS. 9 through 13, the ring 13 is rotated by using the wire rope 15, the pre-tensioner drive unit may be structured by using pyrotechnics that powder is ignited corresponding to a collision detection signal so as to develop gas pressure to rapidly rotate the driven shaft. Such a structure is often used.

FIGS. 14 through 16 show such a conventional cartridge-activated pre-tensioner (DE-A 4 444775).

A seat belt device is provided with an emergency reel locking mechanism 21 disposed on the outer surface of a side wall 20a of a frame 20 of the seat belt device and with a return spring unit 22 and a pre-tensioner 23 disposed on the outer surface of a side wall 20b of the frame 20.

The pre-tensioner 23 comprises a driven shaft 24 projecting integrally from a reel, a rotational ring 25 disposed coaxially with the driven shaft 24, housing chambers 27 defined by a steel tape 26 formed around of the rotational ring 25, and a gas generator 28 for supplying gases into the housing chamber 27.

The tape 26 is fixed to a housing 29 at both ends in the longitudinal direction thereof and wound onto the ring 25 on the way thereof.

Once the gas generator 28 is activated to ignite powder, gas pressure is exerted onto only one side of the steel tape 26 through passages 29a, 29b so that the steel tape 26 is pressurized in the counterclockwise direction as shown in FIG. 16. The ring 25 is thereby rotated so as to rotate the driven shaft 24 and the reel in the belt winding direction through a clutch mechanism (not shown).

For the conventional clutch mechanism as shown in FIGS. 9 through 13 in which the ring 13 presses the pins 11 to shear the pins 11 in such a manner that the pins are engaged between the outer surface of the driven shaft 10 (bush 16) and the inner surface of the ring 13, it is important that the pins 11 are securely and rapidiy engaged between the bush 16 and the ring 13 after the pins 11 are sheared.

In this clutch mechanism, however, the rollers 12 tend to be freed from the unit 7 after shearing the pins 11 and then engaged between the bush 16 and the ring 13. It is therefore impossible to control the behavior of the rollers 12 freed between the bush 16 and the ring 13 so that the behavior of the rollers 12 is not constant until being bitten by the bush 16 and the ring 13. Then, there is a possibility of time lag in transmitting the rotational force.

OBJECT AND SUMMARY OF THE INVENTION

It is an object of the present invention to solve the conventional problems and to provide a pre-tensioner for a seat belt device which is provided with a clutch mechanism capable of rapidly and securely transmitting power between the ring and the driven shaft.

A pre-tensioner of a seat belt device of the present invention is provided for rotating a reel of a seat belt retractor in the belt winding direction in emergency of a vehicle. The pre-tensioner comprises: a driven shaft projecting from the reel in the axial direction of the reel; a rotational ring having a central hole into which the driven shaft is inserted; a driving unit for rotating the rotational ring in the belt winding direction; and a clutch mechanism for transmitting rotational torque of the rotational ring to the driven shaft; and the clutch mechanism comprises: intervening members disposed between the inner surface of the central hole of the rotational ring and the outer surface of the driven shaft; supporting members for supporting the intervening members in such a manner that the intervening members are disposed at positions spaced apart from the outer surface of the driven shaft in the normal state; and guide faces formed in the inner surface of the rotational ring, the guide faces pressing the intervening members to move the intervening members toward the outer surface of the driven shaft when the rotational ring is rotated in the belt winding direction. In the pre-tensioner, the rotational ring is provided with spaces between the peripheral edges of the guide faces and the supporting members, and parts of the intervening members exist in the spaces so that the intervening members remain being connected to the supporting members until the intervening members come in contact with the outer surface of the driven shaft during the guide faces press the intervening members.

In the pre-tensioner, the intervening members are supported by the supporting members until the intervening members are engaged between the outer surface of the driven shaft and the rotational ring. Therefore, the intervening members are always in a predetermined direction or attitude, thereby enabling secure and rapid torque transmission between the driven shaft and the rotational ring.

BRIEF DESCRIPTION OF THE DRAWINGS

FIGS. 3a and 3b are front views of a rotational ring, FIG. 3a showing the state before operation and FIG. 3b showing the state in operation, FIG. 6 is an exploded perspective view of parts of the pre-tensioner for the seat belt device.

PREFERRED EMBODIMENT

Hereinafter, a pre-tensioner according to an embodiment will be described with reference to FIGS. 1 through 7.

Figure 4:
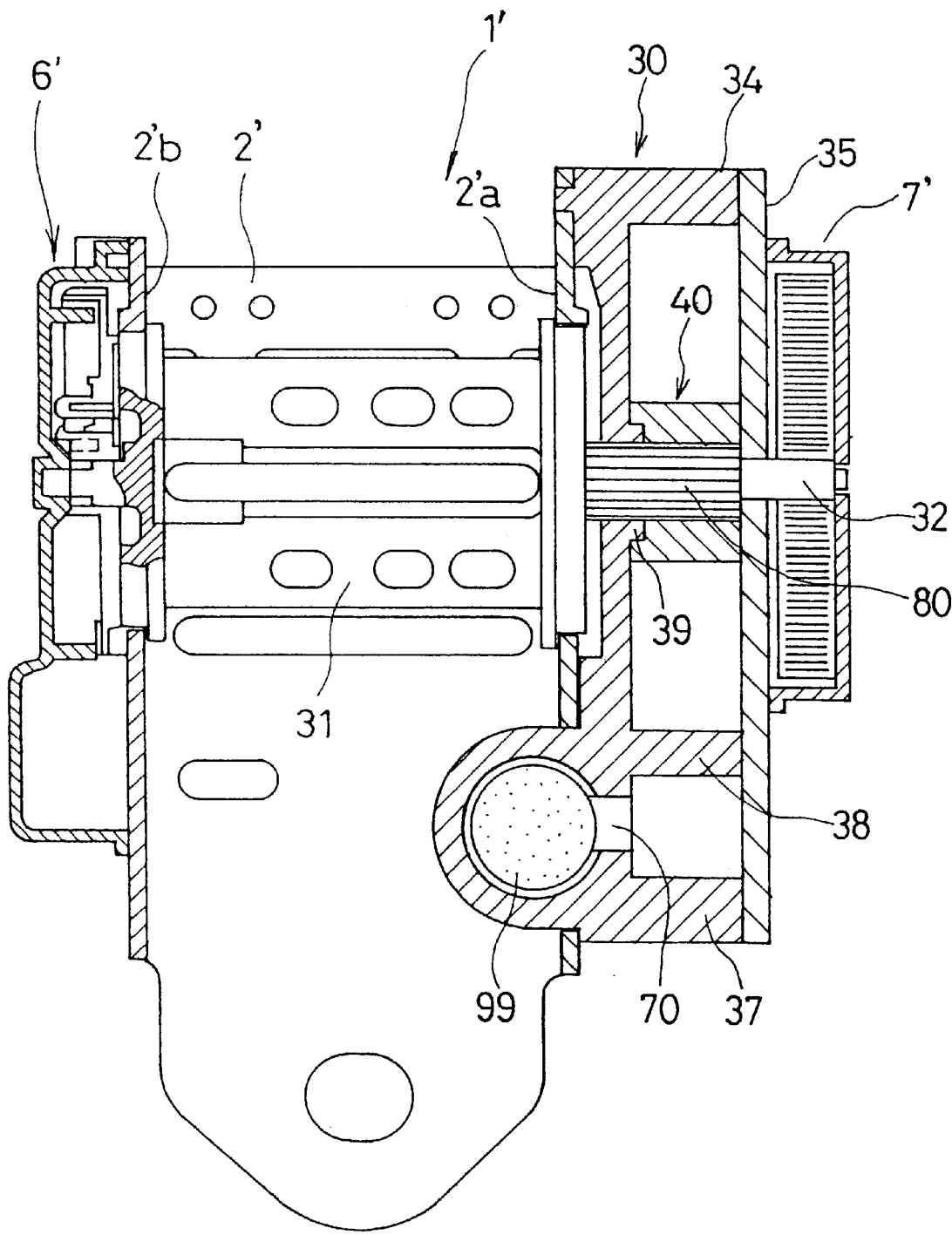
FIG. 4 is a sectional view of the seat belt device with the pre-tensioner according to the embodiment.

As shown in FIG. 4, a seat belt retractor 1' comprises a U-like frame 2' and a reel 31 disposed between side walls 2'a and 2'b of the frame 2'. A seat belt is wound on the reel 31. Disposed outside the side wall 2'a is a pre-tensioner 30 and disposed still outside the pre-tensioner 30 is a return spring unit 7' for biasing the reel in the winding direction. Disposed outside the side wall 2'b is an emergency locking mechanism 6' for preventing the rotation of the reel (i.e. the withdrawing of the seat belt) when a vehicle is rapidiy decelerated.

Figure 5:
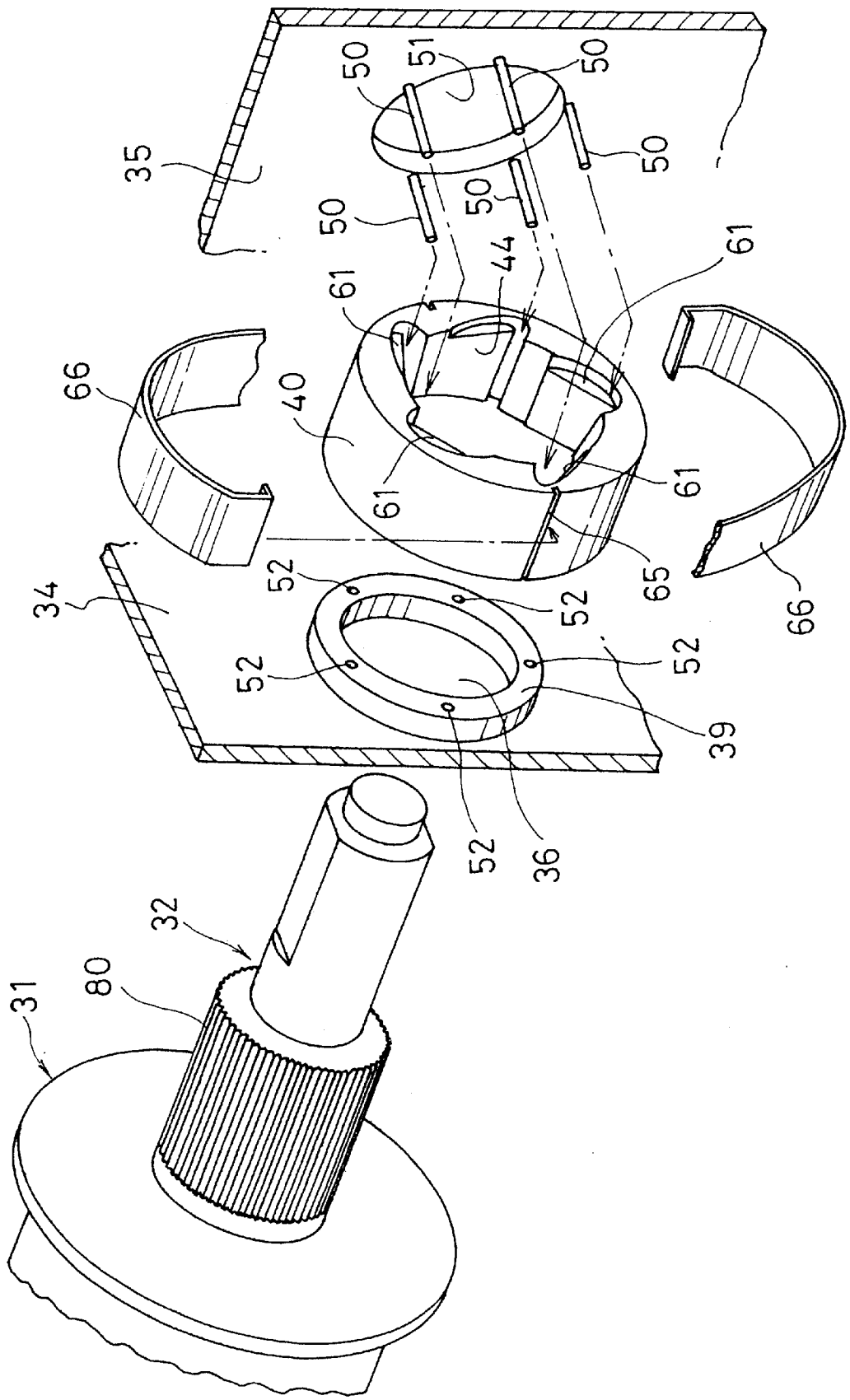
FIG. 5 is an exploded perspective view of parts of the pre-tensioner for the seat belt device.

The pre-tensioner 30 comprises a housing 33 which is penetrated with a driven shaft 32 projecting from the belt winding reel 31 (FIG. 5). The housing 33 comprises a body 34 and a cover 35. The body 34 has an opening 36 at the center thereof, through which the driven shaft 32 is inserted. The body 34 has a peripheral wall 37 integrally formed on the periphery thereof and a partition wall 38 extending along a portion of the peripheral wall 37.

As shown in FIG. 5, the body 34 is provided with a convex annular portion 39 on the periphery of the opening 36, onto which a rotational ring 40 is fitted.

The rotational ring 40 has a cylindrical outer surface and a heterotypic pentagonal central hole 41.

The rotational ring 40 is provided with a stepped portion 42 (FIGS. 7a, 7b, 7c) formed in the inner surface thereof along the periphery of the central hole 41 at one end of the rotational ring 4. The stepped portion 42 is slidably fitted onto the annular portion 39.

The rotational ring 40 is provided with five guide faces 44 formed in the inner surface thereof, each having a starting end and a terminal end in the belt winding direction. As clearly shown in FIGS. 3 and 7, each guide face 44 is formed in such a manner that the terminal end is nearer than the starting end to the center of the rotational ring 40.

Formed between the adjacent guide faces 44 are convex portions 45 projecting toward the center of the rotational ring 40. Formed between the terminal end of each guide face 44 and each convex portion 45 is a pocket-like concave portion (hereinafter, referred to as a "pocket portion") 46 in which each pin 50 is inserted.

The pins 50 are, as shown in FIG. 5, fixed around the periphery of an opening formed in the cover 35, through which the driven shaft is inserted. The ends of the pins 50 are inserted into pin holes 52 formed in the annular portion 39.

The rotational ring 40 is provided with stepped portions 60 (FIGS. 7a, 7b, 7c) formed in portions of the inner surface thereof facing the annular portion 39. The rotational ring 40 is further provided with stepped portions 61 along the guide faces 44 at the other ends thereof. The stepped portions 60, 61 form spaces 62, 63 (FIG. 7c) along both peripheries of the guide faces 44, respectively.

The rotational ring 40 has two shallow grooves 65 (FIG. 5) formed in the outer surface, extending parallel to the axis of the rotational ring 40. Both ends of a steel tape 66 are fitted into the grooves 65. The both end portions of the tape 66 are wound around the rotational ring 40 several times and the rest of the tape 66 is put in the housing 33 to extend along the peripheral wall 37.

The body 34 of the housing 33 is provided with a gas inlet 70 formed in a portion between the peripheral wall 37 and the partition wall 38. The tape 66 is put between the peripheral wall 37 and the partition wall 38 to extend across the center of the gas inlet 70.

The peripheral wall 37 has an approaching wall 68 and the partition wall 38 has an approaching wall 67, the approaching walls extending toward the rotational ring 40. The housing 33 is divided into two chambers by the tape 66 put along the approaching walls 67, 68. One chamber 71 communicates with the outside through a cut portion 73 formed in the peripheral wall 37. The other chamber 72 communicates with the outside through an opening 74 formed in the housing body 34.

The inside of the housing 33 is communicated with a gas port of a gas generator 99 (FIG. 4) through the gas inlet 70.

Figure 1:
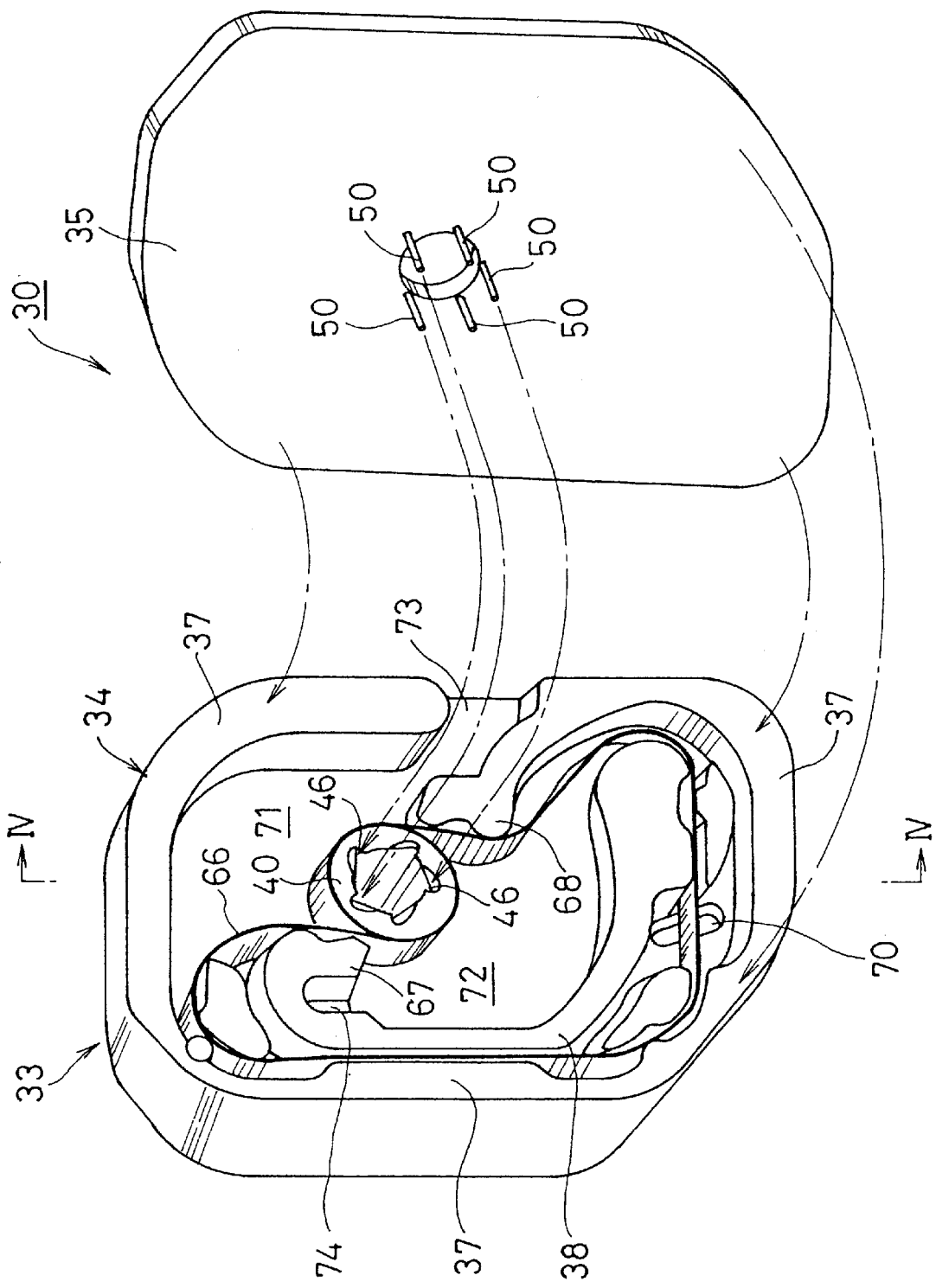
FIG. 1 is an exploded perspective view of a pre-tensioner for a seat belt device according to an embodiment of the present invention.
Figure 2B:
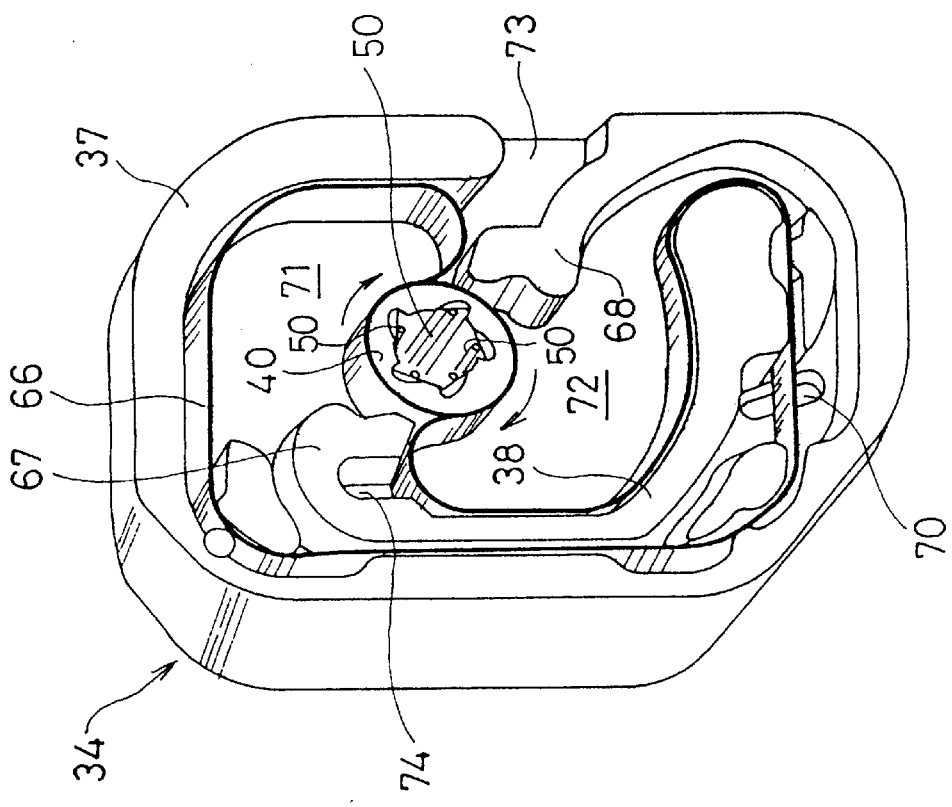
FIG. 2a is a perspective view showing the internal stricture of the pre-tensioner for the seat belt according to the embodiment and FIG. 2b is a perspective view showing the operation of the device.
Figure 2A:
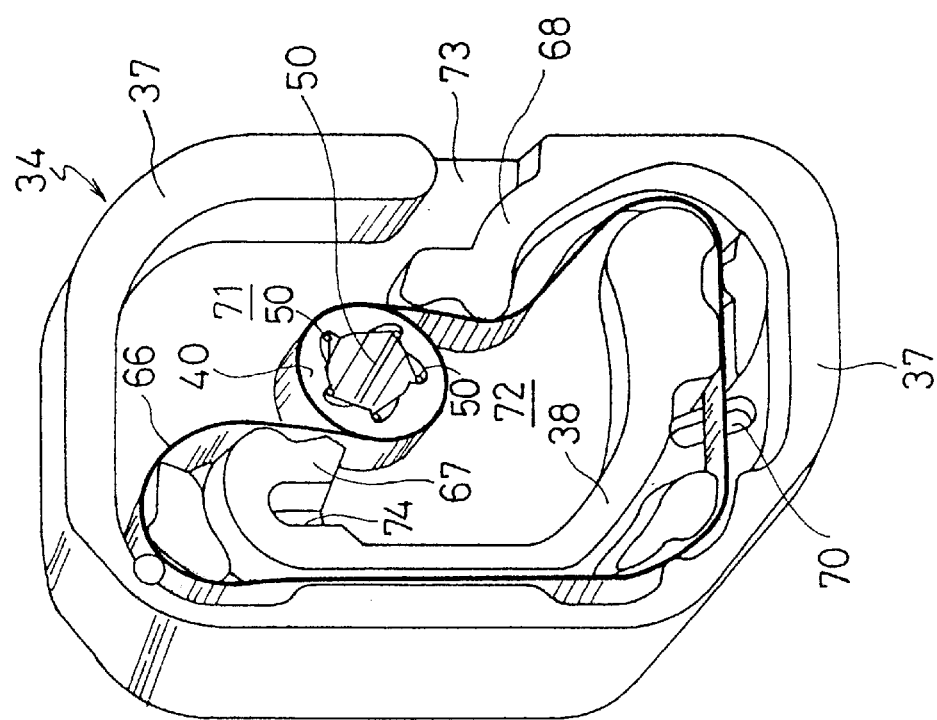

Once the gas generator 99 is activated, gases flow into the housing 33 through the gas inlet 70 and then flow into the chambers 71, 72, divided by the tape 66, through spaces between the peripheral wall 37 and the partition wall 38. The gas pressure moves the tape 66 in such a manner that the tape 66 expands across the insides of the chambers 71, 72 as shown in FIG. 2b and FIG. 3b. The movement of the tape 66 within the chambers 71, 72 withdraws the tape 66 wound onto the rotational ring 40 so that the rotational ring 40 rotates in the clockwise direction of FIG. 2b and FIG. 3b.

Figure 7A:
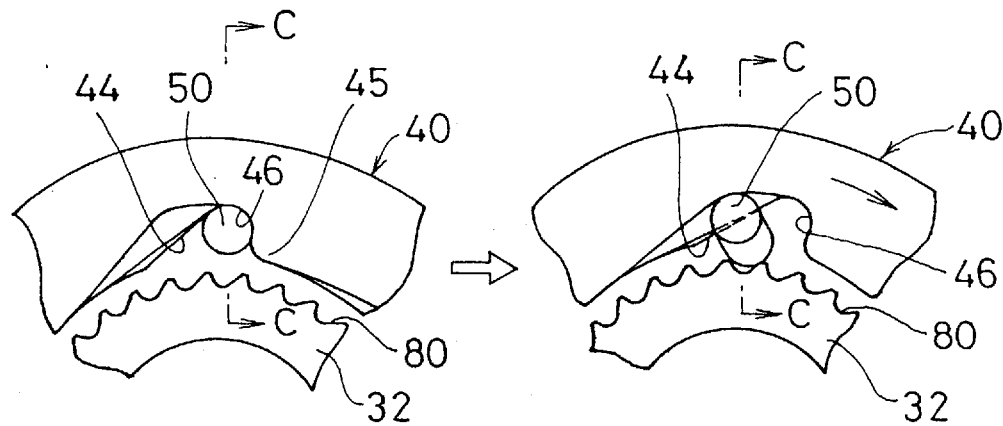
FIGS. 7a, 7b, 7c are explanatory views showing the relation between the rotational ring and the driven shaft.
Figure 7B:
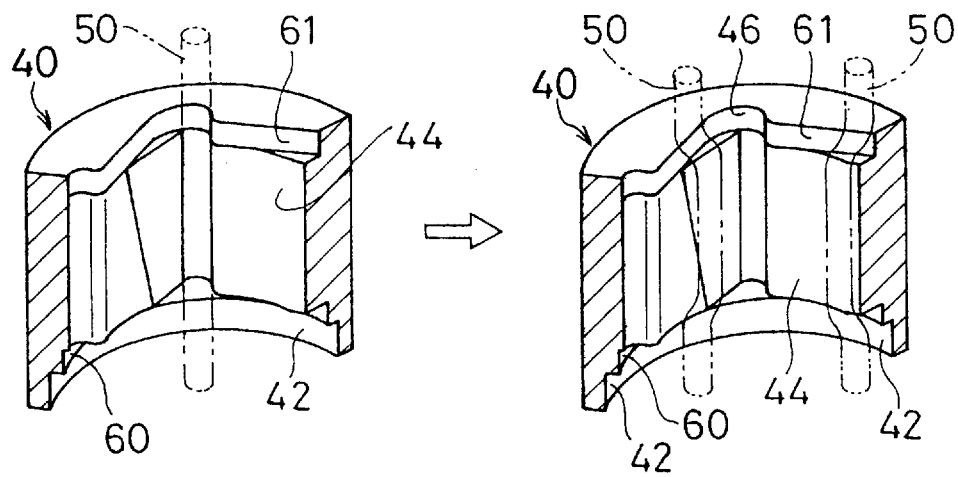
Figure 7C:
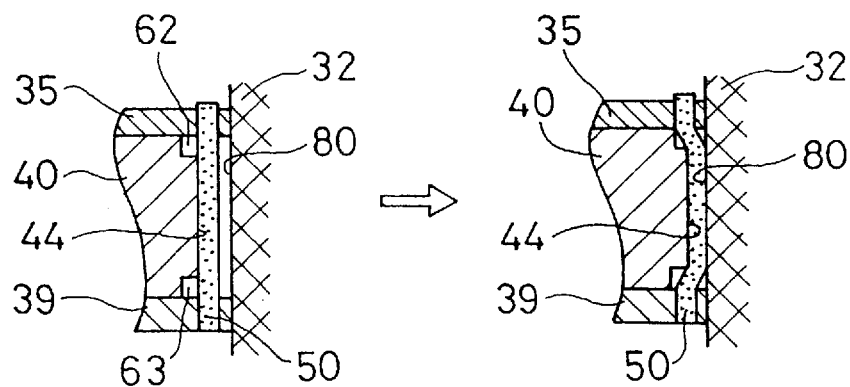

Therefore, each pin 50 positioned in the pocket portion 46 at the deepest of the guide face 44 so far as shown on the left sides in FIGS. 7a, 7b, 7c is pressed by the guide face 44 in such a manner that the pin 50 is deformed to project in the centripetal direction of the rotational ring 40 as shown on the right sides in the same figures. The pins 50 are pressed against a spur gear 80 of the driven shaft 32 so that the pins 50 are engaged between the rotational ring 40 and the driven shaft 32. As the pins 50 are engaged, the rotational torque of the rotational ring 40 is transmitted to the driven shaft 32, whereby the reel 31 rotates to wind up the seat belt 5.

The pins 50 are held by the pin holes 52 of the annular portion 39 and the housing cover 35 until the pins 50 are engaged between the guide faces 44 and the gear 80. The reason is that there are the spaces 62, 63 along the peripheries at the respective both ends of the guide faces 44 as shown in FIG. 7c. That is, when the pins 50, which are each held at both ends by the annular portion 39 and the housing cover 35, are pressed by the guide faces 44, the pins 50 are deformed to be stretched in the spaces 62, 63 existing between the guide faces 44 and the annular portion 39 and between the guide faces 44 and the housing cover 35. As the rotational ring 40 continues the rotation with the pins 50 being engaged between the guide faces 44 and the gear 80, the pins 50 are sheared by the convex portions 45 of the rotational ring 40 or come off the pin holes 52.

Since the pins 50 are held at both ends by the annular portion 39 (the housing body 34) and the housing cover 35 until the pins 50 are engaged between the gear 80 and the guide faces 44, the pins 50 are engaged between the gear 80 and the guide faces 44 with the pins 50 being held in the attitudes parallel to the axis of the driven shaft 32. The result is secure and rapid torque transmission between the rotational ring 40 and the driven shaft 32 through the pins 50.

Figure 8A:
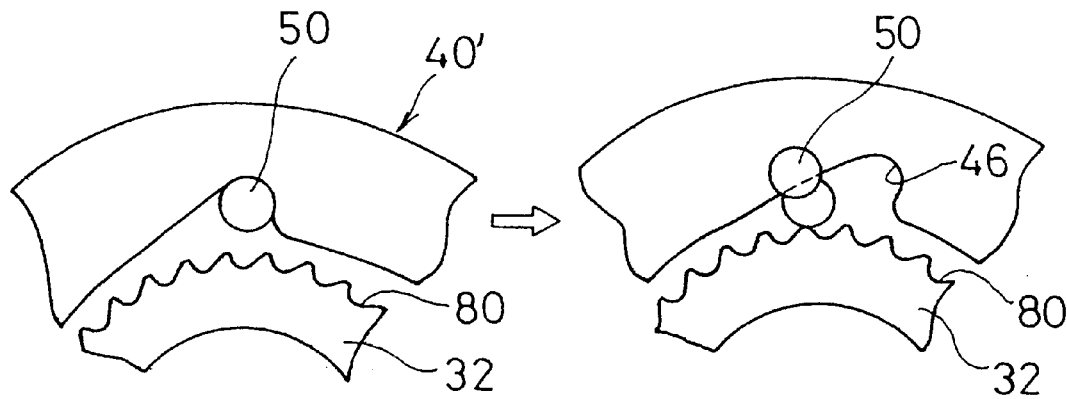
FIGS. 8a, 8b, 8c are explanatory views showing the relation between a rotational ring and a driven shaft of a comparative example.
Figure 8B:
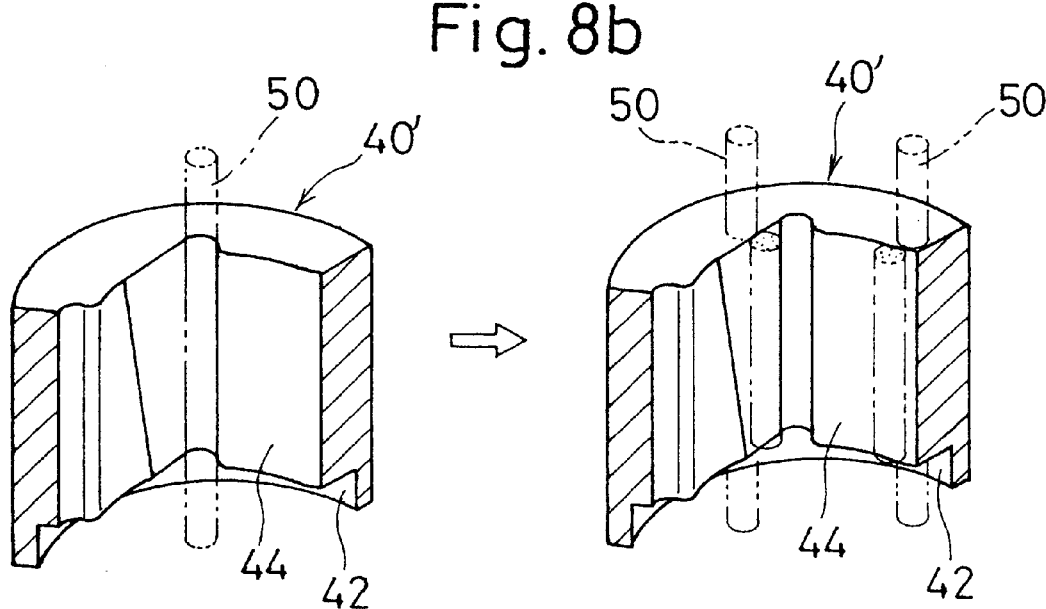

Hereinafter the operation of a comparative example without the spaces 62, 63 will be described with reference to FIG. 8.

Figure 8C:
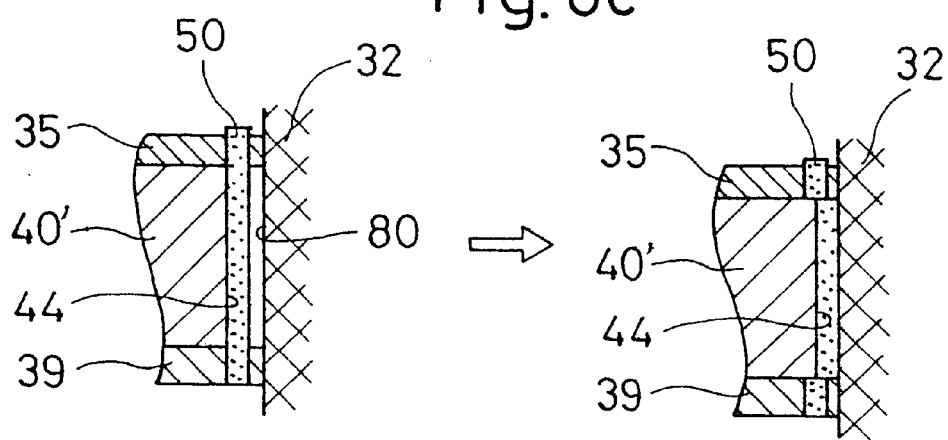
Figure 9:
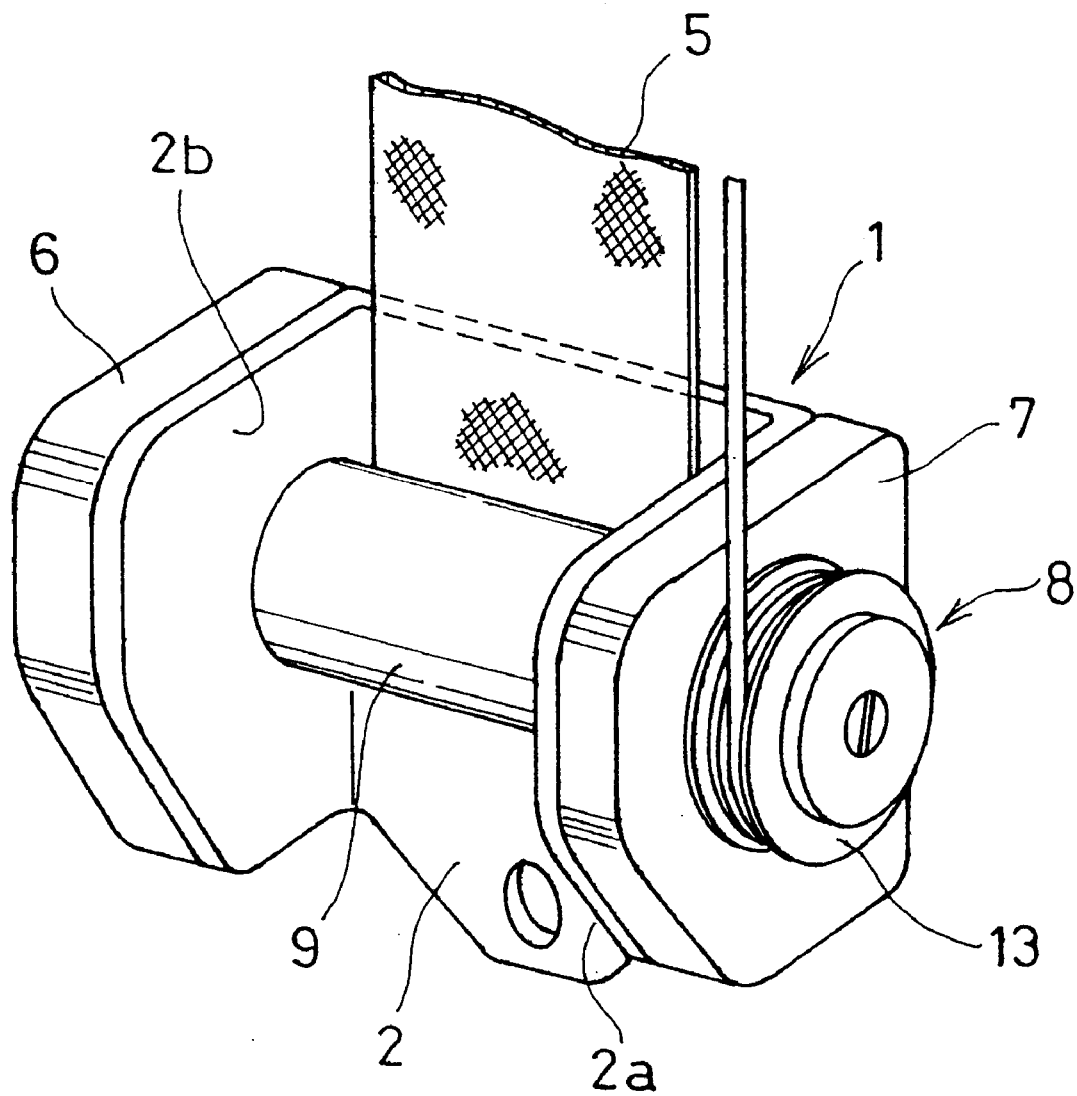
FIG. 9 is a perspective view of a conventional seat belt device.
Figure 10:
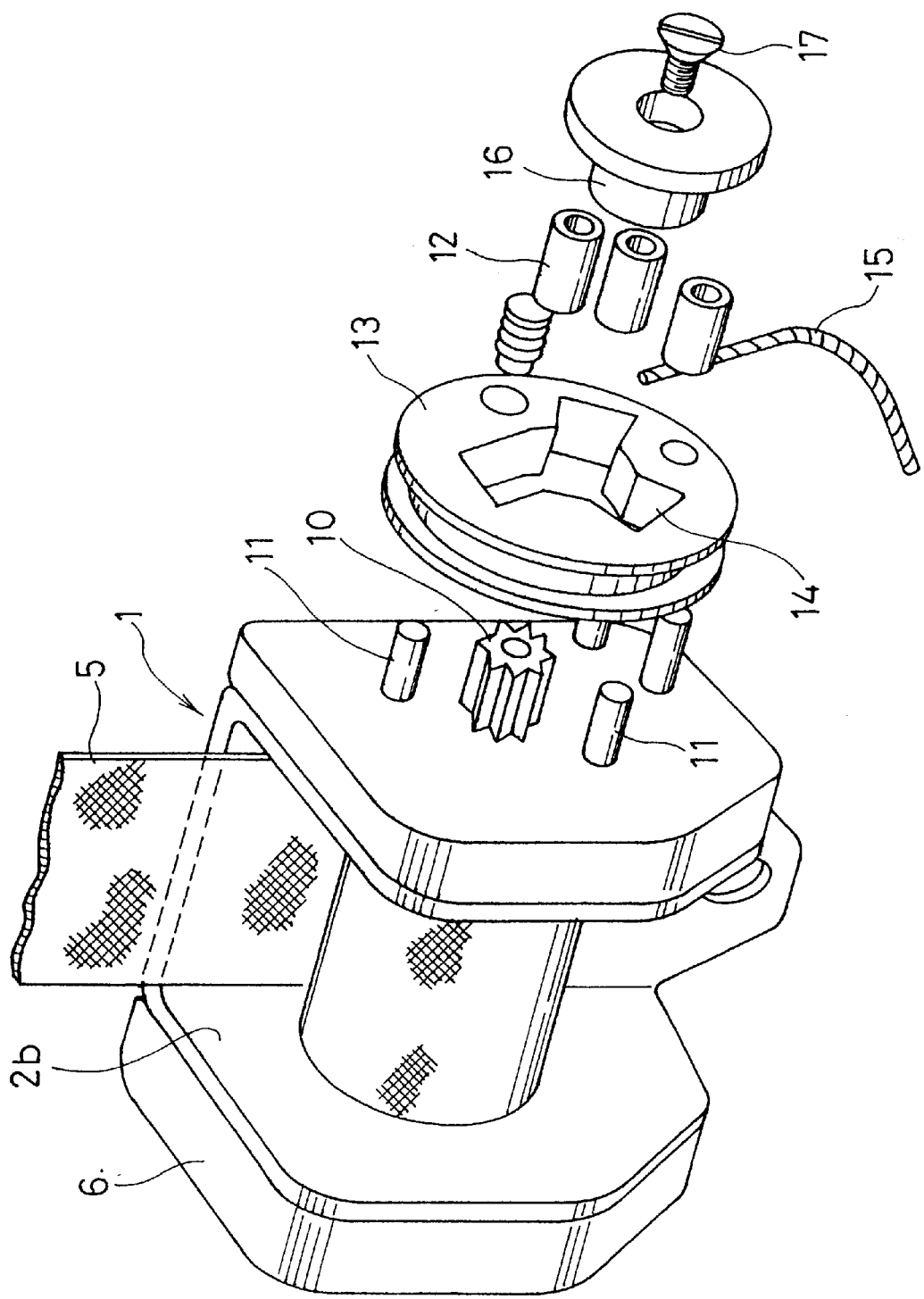
FIG. 10 is an exploded perspective view of the conventional seat belt device.
Figure 11:
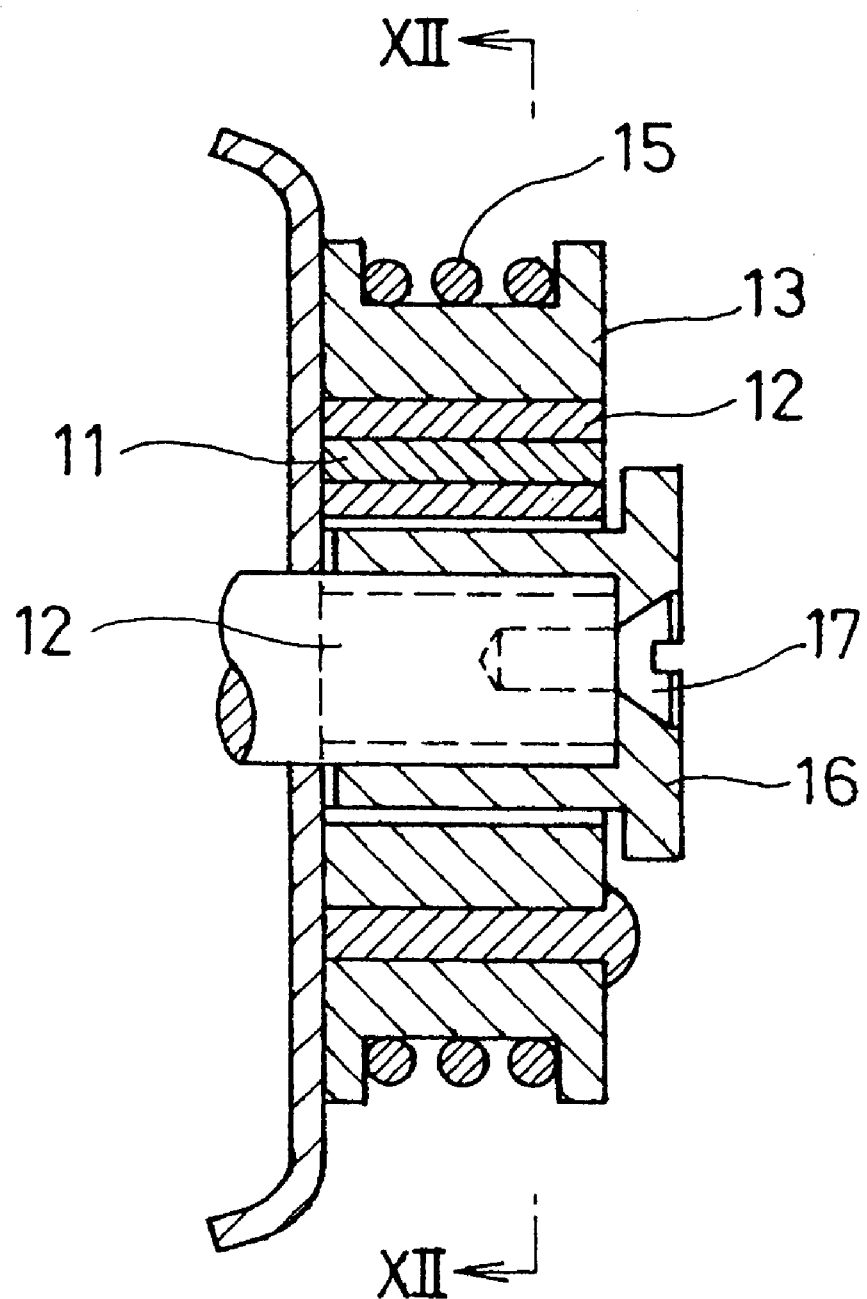
FIG. 11 is a partial sectional view of the conventional seat belt device.
Figure 12:
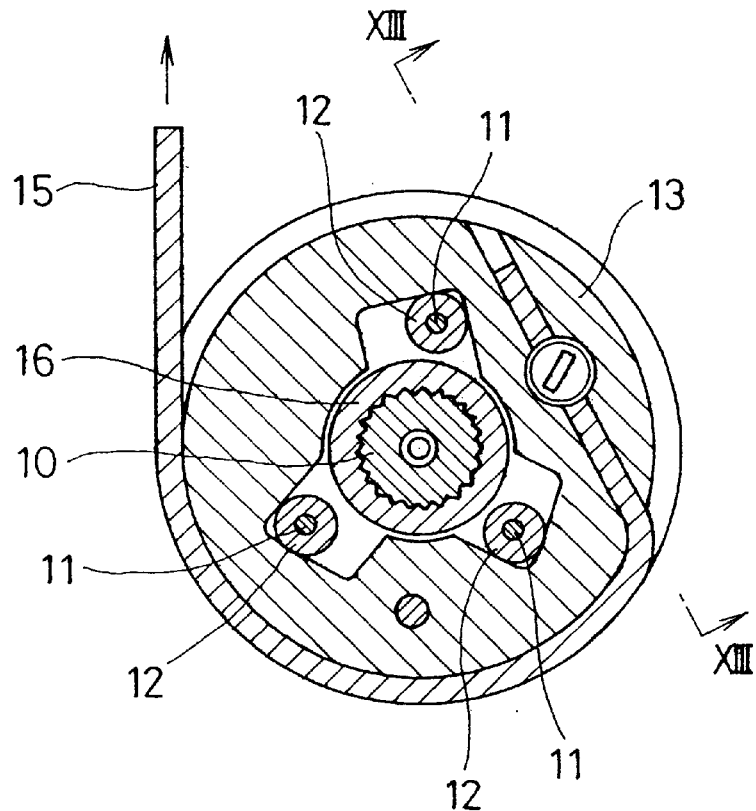
FIG. 12 is a sectional view taken along a line XII—XII of FIG. 11.
Figure 13:
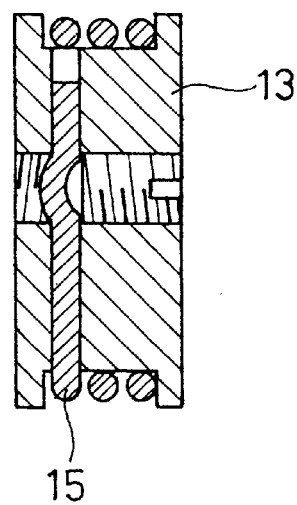
FIG. 13 is a sectional view taken along a line XIII—XIII of FIG. 12.
Figure 14:
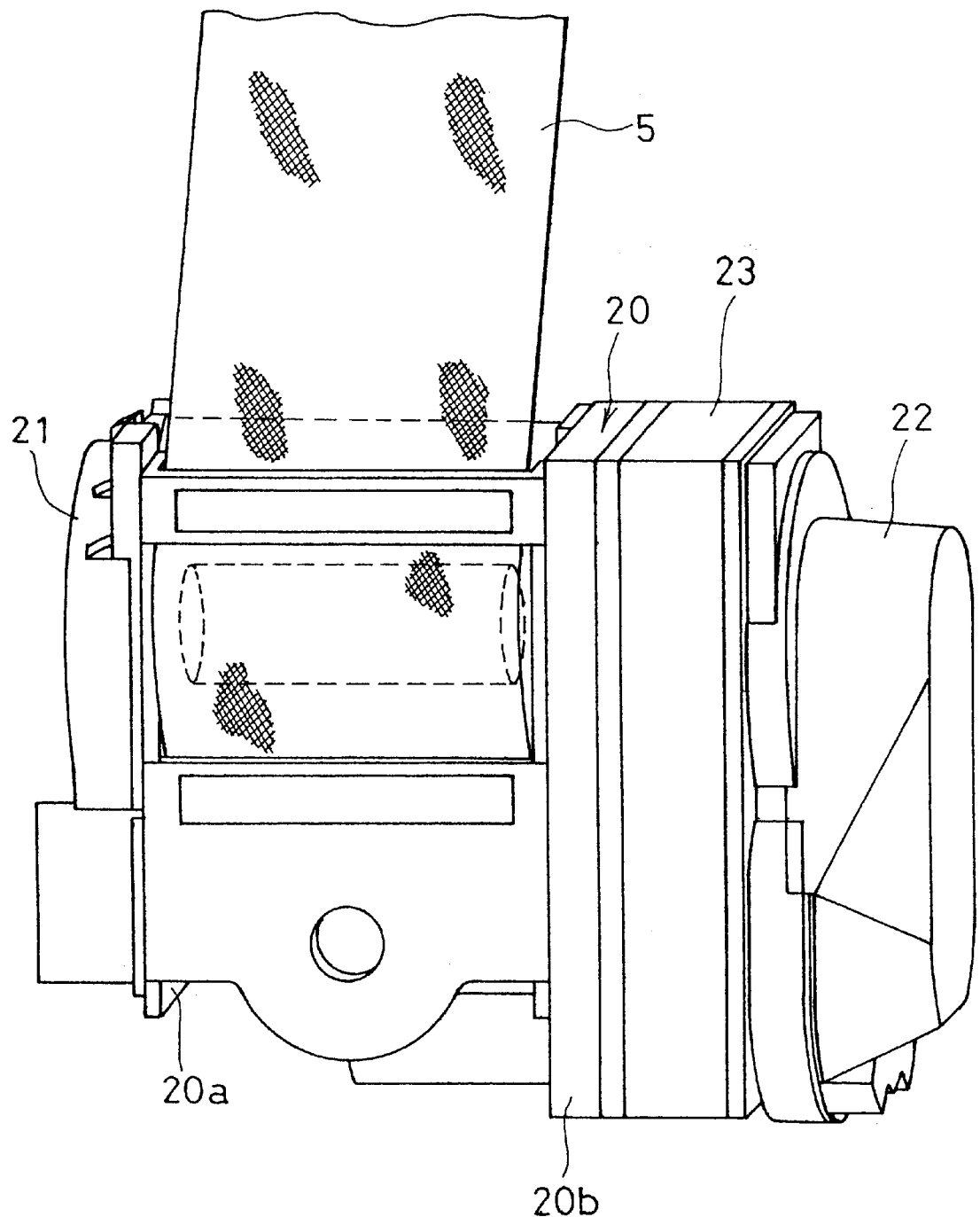
FIG. 14 is a perspective view of a seat belt device according to another conventional example.
Figure 15:
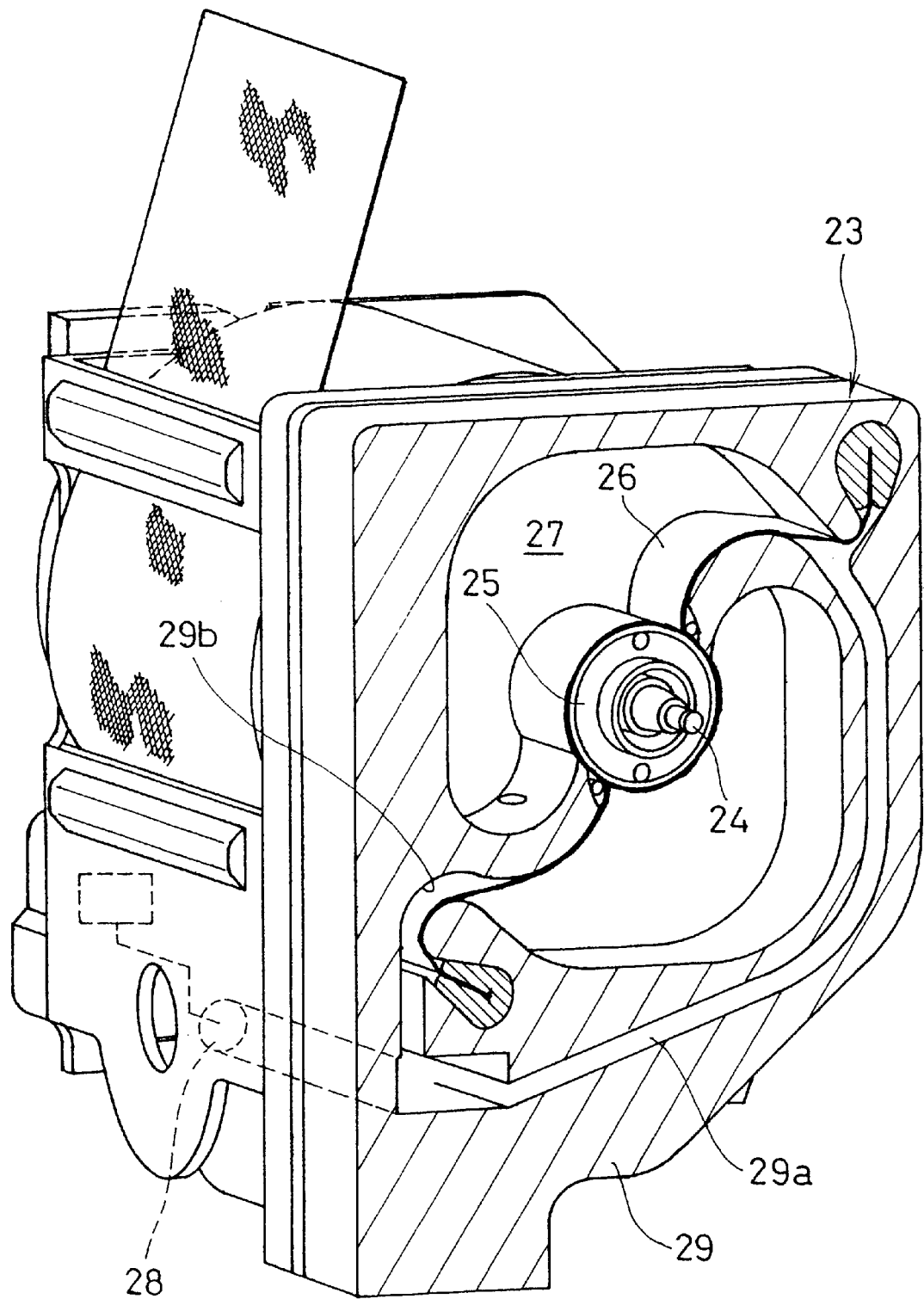
FIG. 15 is a perspective view showing the internal structure of the device shown in FIG. 14.
Figure 16:
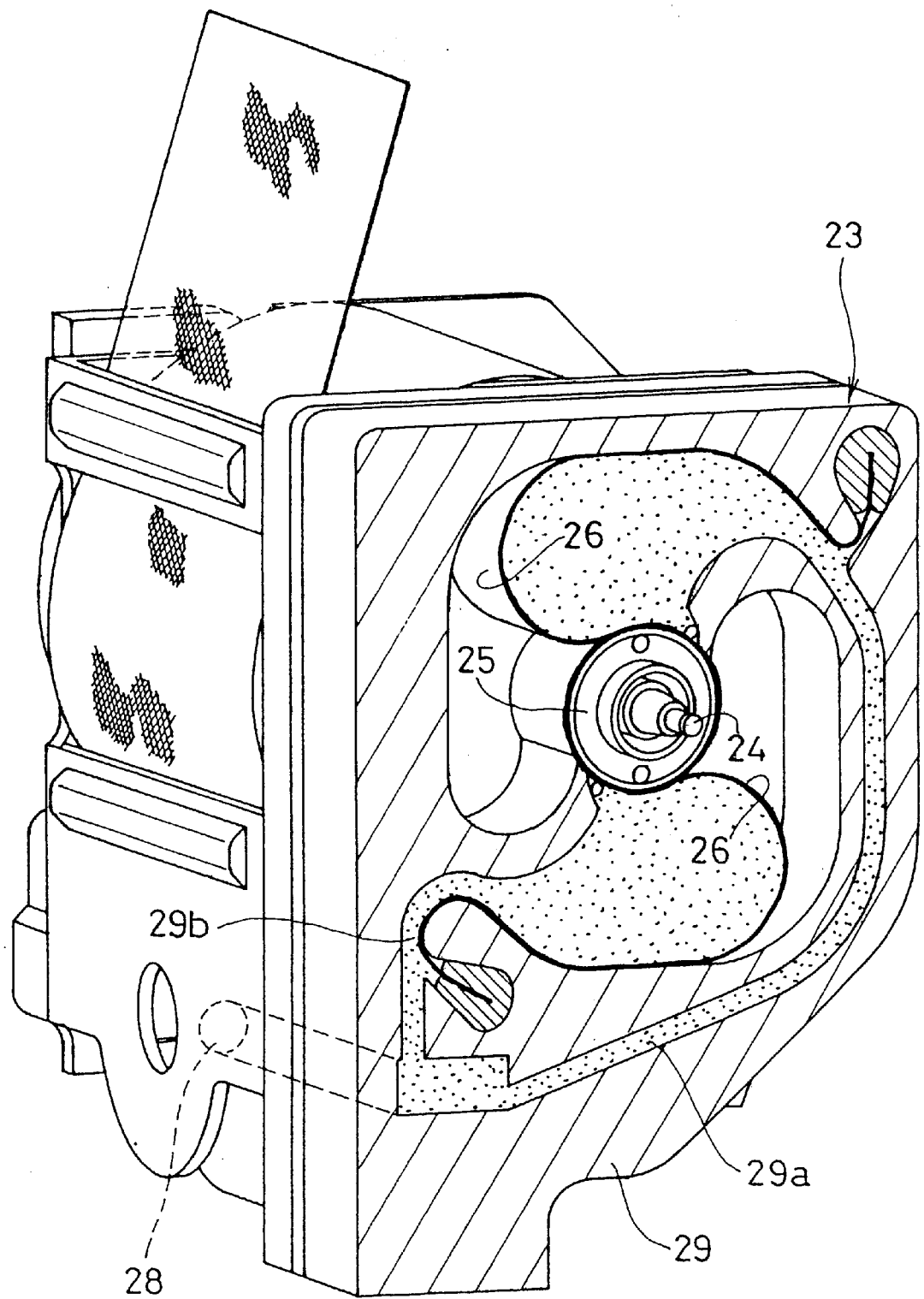
FIG. 16 is a perspective view showing the operation of the device shown in FIG. 14.

In this example, once a gas generator is activated and a rotational ring 40' rotates, the pins 50 are pressed by the guide faces 44 against the outer surface of the driven shaft 32. Since there is no spaces 62, 63 at the both sides of the guide faces 44 as shown in FIG. 8c, the both peripheries are directly in contact with the annular portion 39 and the housing cover 35, the pins 50 are sheared by the edges of the guide faces 44 before coming in contact with the gear 80. Therefore, the pins 50 are in respective attitudes so that there is a possibility that the pins 50 are bitten between the gear 80 and the guide faces 44 with the pins 50 being directed not in parallel with the axis of the driven shaft 32. When the pins 50 are bitten in such attitudes, the time required for enabling the torque transmission between the rotational ring 40 and the driven shaft 32 may be prolonged.

The present invention is suitably applied to the case where the driven shaft 32 has a spur gear 80 as the above embodiment. That is, the pins 50 can be securely engaged with teeth of the gear 80 by pressing the pins 50 against the gear 80 with holding the pins in parallel with the axis of the driven shaft 32.

Though the pins 50 are held by the housing body 34 and the housing cover 35 in the above embodiment, the pins 50 may be held at one end by either one of the body 34 and cover 35, i.e. overhung.

As described above, according to the present invention, the secure and rapid torque transmission between the driven shaft and the rotational ring is established at a time that the pre-tensioner is activated. Therefore, the seat belt can be rapidly preloaded when the vehicle comes into collision.

What is claimed is:

1. A pre-tensioner of a seat belt device for rotating a reel of a seat belt retractor in the belt winding direction in emergency of a vehicle, the pre-tensioner comprising:

a driven shaft projecting from the reel in the axial direction of the reel;

a rotational ring having a central hole into which said driven shaft is inserted;

a driving unit for rotating said rotational ring in the belt winding direction; and a clutch mechanism for transmitting rotational torque of the rotational ring to said driven shaft; said clutch mechanism comprising:

at least one intervening member disposed between the inner surface of the central hole of said rotational ring and the outer surface of said driven shaft;

a supporting member for supporting said intervening member in such a manner that the intervening member is disposed at a position spaced apart from the outer surface of said driven shaft in the normal state; and at least one guide face formed in the inner surface of said rotational ring, said guide face pressing said intervening member to move the intervening member toward the outer surface of said driven shaft when said rotational ring is rotated in the belt winding direction; wherein said rotational ring is provided with a space between the peripheral edge of said guide face and said supporting member, a part of the intervening member exists in said space so that the intervening member remains being connected to said supporting member until said intervening member comes in contact with the outer surface of said driven shaft during the guide face presses said intervening member.

2. A pre-tensioner of a seat belt device as claimed in claim 1, wherein said driven shaft has a spur gear formed in the outer surface thereof.

3. A pre-tensioner of a seat belt device as claimed in claim 1, wherein said intervening member comprises a pin which is disposed in parallel with the axis of said driven shaft.

4. A pre-tensioner of a seat belt device as claimed in claim 3, wherein said rotational ring is provided with a plurality of said guide faces formed in the inner surface of said rotational ring in the circumferential direction, said guide faces each having a starting end and a terminal end in the belt winding direction in such a manner that the terminal end is nearer than the starting end to the center of the rotational ring, and each guide face is formed in gentle slope from the starting end to the terminal end in the direction coming closer to the center of the rotational ring.

5. A pre-tensioner of a seat belt device as claimed in claim 4, wherein said supporting member is slidably in contact with said rotational ring with the exception with the peripheries of said guide faces, and said spaces are formed in a side face of said rotational ring along the periphery of the central hole by cutting out the peripheries of said guide faces.

* * * * *